United States Patent
Du et al.

(10) Patent No.: US 11,404,697 B2
(45) Date of Patent: Aug. 2, 2022

(54) SOLID ELECTROLYTE INTERPHASE FORMING COMPOSITION, BATTERY COMPRISING THE SOLID ELECTROLYTE INTERPHASE AND ANODE-FREE BATTERY COMPRISING THE SOLID ELECTROLYTE INTERPHASE

(71) Applicant: Factorial Inc., Woburn, MA (US)

(72) Inventors: Jia Du, North Reading, MA (US); Luxi Shen, Woburn, MA (US); Yaqi Tu, Woburn, MA (US); Karlie Mellott, Woburn, MA (US); Dong Ren, Wilmington, MA (US)

(73) Assignee: Factorial Inc., Woburn, MA (US)

( * ) Notice: Subject to any disclaimer, the term of this patent is extended or adjusted under 35 U.S.C. 154(b) by 266 days.

(21) Appl. No.: 16/512,393

(22) Filed: Jul. 16, 2019

(65) Prior Publication Data
US 2021/0020949 A1 Jan. 21, 2021

(51) Int. Cl.
*H01M 4/24* (2006.01)
*H01M 4/62* (2006.01)
*C09D 171/02* (2006.01)
*H01M 4/36* (2006.01)

(52) U.S. Cl.
CPC ......... *H01M 4/628* (2013.01); *C09D 171/02* (2013.01); *H01M 4/366* (2013.01)

(58) Field of Classification Search
None
See application file for complete search history.

(56) References Cited

U.S. PATENT DOCUMENTS

| | | | |
|---|---|---|---|
| 2016/0261000 A1 | 9/2016 | Zhang et al. | |
| 2019/0115617 A1* | 4/2019 | Pan | H01M 4/366 |
| 2020/0028179 A1* | 1/2020 | He | H01M 4/628 |
| 2021/0013490 A1* | 1/2021 | Lin | H01M 4/366 |

FOREIGN PATENT DOCUMENTS

WO 2018227689 12/2018

OTHER PUBLICATIONS

Assegie et al. Polyethylene oxide film coating enhances lithium cycling efficiency of an anode-free lithium-metal battery, Nanoscale, 2018, 10, 6125. (Year: 2018).*
S.Feng et al., Single lithium-ion conducting polymer electrolytes based on poly[(4-styrenesulfonyl)(trifluoromethanesulfonyl)imide] anions, Electrochimica Acta, vol. 93, 2013, pp. 254-263. (Year: 2013).*
Siyuan Li et al., "Rational design of robust-flexible protective layer for safe lithium metal battery", Energy Storage Materials, Sep. 2018, pp. 1-8.
Shizhaoxiong et al., "Properties of surface film on lithium anode with LiNO3 as lithium salt in electrolyte solution for lithium-sulfur batteries", Electrochimica Acta, Nov. 2012, pp. 78-86.

(Continued)

*Primary Examiner* — Lucas J. O'Donnell
(74) *Attorney, Agent, or Firm* — JCIP Global Inc.

(57) ABSTRACT

A composition for forming an artificial sold electrolyte interphase (SEI) layer includes a polymer, an artificial SEI forming salt, and a solvent. The polymer and the artificial SEI forming salt are dispersed in the solvent.

15 Claims, 1 Drawing Sheet

(56) References Cited

OTHER PUBLICATIONS

Zhengyuan Tu et al., "Designing Artificial Solid-Electrolyte Interphases for Single-Ion and High-Efficiency Transport in Batteries", Joule, Oct. 11, 2017, pp. 394-406.
Jiangfeng Qian et al., "Anode-Free Rechargeable Lithium Metal Batteries", Adv. Funct. Mater., Oct. 18, 2016, pp. 7094-7102.
Nian-Wu Li et al., "An Artificial Solid Electrolyte Interphase Layer for Stable Lithium Metal Anodes", Adv. Mater., Mar. 2, 2016, pp. 1853-1858.
Bin Li et al., "A Material Perspective of Rechargeable Metallic Lithium Anodes", Adv. Energy Mater., May 4, 2018, pp. 1-16.
Nian-Wu Li et al., "A Flexible Solid Electrolyte Interphase Layer for Long-Life Lithium Metal Anodes", Angew. Chem. Int. Ed., Feb. 5, 2018, pp. 1505-1509.
Xiao Liang et al., "A facile surface chemistry route to a stabilized lithium metal anode", Nature Energy, Jul. 31, 2017, pp. 1-7.

* cited by examiner

SOLID ELECTROLYTE INTERPHASE FORMING COMPOSITION, BATTERY COMPRISING THE SOLID ELECTROLYTE INTERPHASE AND ANODE-FREE BATTERY COMPRISING THE SOLID ELECTROLYTE INTERPHASE

FIELD

The present disclosure generally relates to various compositions for forming artificial solid electrolyte interphase (SEI) layers and electrodes having at least one of the artificial solid electrolyte interphase layers. The artificial solid electrolyte interphase layers and the electrodes are suitable for electrochemical devices such as batteries, capacitors, sensors, condensers, electrochromic elements, photoelectric conversion elements, etc.

BACKGROUND

High-energy-density storage systems are urgently needed to satisfy the ever-increasing demand in electric vehicles, consumer electronics, and grid-scale storage. However, the energy density of existing batteries remains insufficient for many of these applications. Lithium (Li) metal is a promising anode material for high-energy-density storage systems due to high specific capacity (3860 mAhg$^{-1}$) and low reduction potential (−3.04V versus the standard hydrogen electrode (SHE)).

Despite these unique properties, the dynamic Li plating/stripping behavior on the Li anode surface can damage the static and unstable solid electrolyte interphase, resulting in sides reactions between Li metal and electrolytes, Li dendrites growth, and finally the degeneration of Li metal batteries. Specifically, due to the high reactivity, Li can react spontaneously with organic electrolyte solvents and Li salts to instantly form a SEI layer on the Li anode surface. Unfortunately, the brittle SEI layer cannot withstand the mechanical deformation, which would lead to the formation of cracks. The cracks enhance the Li-ion flux and result in the Li dendrite growth and new SEI formation. During the Li stripping process, the volume contraction induces new SEI fractures and the breakage of Li dendrite. The recurring breakage/repair of SEI consumes a lot of Li metal and electrolyte, leading to the accumulation of side reactions, drying up of electrolytes, severe corrosion of Li metal anode, and battery failure.

SUMMARY

The present disclosure generally relates to various compositions for forming artificial SEI layers. The artificial ESI layers may be used as electrode protective layer, separator protective layer, or other applications. For example, the artificial SEI layers can be used as a membrane in electrochemical cells of batteries, such as lithium-ion batteries or other type of batteries. The present disclosure involves, in some cases, interrelated products, alternative solutions to a particular problem, and/or a plurality of different uses of one or more systems and/or articles.

In another aspect, the present disclosure is generally directed to a composition for forming an artificial SEI layer. In one set of embodiments, the composition includes a polymer, an artificial SEI forming salt, and a solvent. The polymer and the artificial SEI forming salt are dispersed in the solvent.

In another aspect, the present disclosure is generally directed to an article. The article includes a base material and a membrane evenly distributed on the base material. The membrane is formed from the aforementioned composition.

In another aspect, the present disclosure is generally directed to a method of forming an article. The method includes at least the following steps. A based material is provided. A slurry having the aforementioned composition is applied on the base material. The solvent of the composition is removed from the slurry to form a dried membrane evenly distributed on the base material.

In another aspect, the present disclosure is generally directed to an anode-free rechargeable battery. The anode-free rechargeable battery includes a first current collector having an artificial SEI layer formed thereon, a cathode, a separator, and an electrolyte. The artificial SEI layer includes a polymer and an artificial SEI forming salt. The cathode contains an electroactive material. The separator is placed between the first current collector and the cathode. The electrolyte includes a salt or a salt mixture dissolved in a solvent.

In another aspect, the present disclosure is generally directed to a battery. The battery includes an anode having a first artificial SEI layer formed thereon, a cathode having a second artificial SEI layer formed thereon, and an electrolyte between the anode and the cathode.

In another aspect, the present disclosure encompasses methods of making one or more of the embodiments described herein, for example, an anode having an artificial SEI layer formed thereon, and a cathode having an artificial SEI layer formed thereon. In still another aspect, the present disclosure encompasses methods of using one or more of the embodiments described herein, for example, an anode with a protective layer, a cathode with an artificial SEI layer, or the like.

In another aspect, the present disclosure encompasses methods of forming an anode-free rechargeable battery. The method includes at least the following steps. A pre-assembled cell with an anode current collector and a cathode is formed. The anode current collector has the aforementioned SEI layer formed thereon. A mixture of liquid electrolyte and monomer or polymer in a liquid phase of the electrolyte is introduced into the pre-assembled cell. Then, a thermal gelation process is performed to form the anode-free rechargeable battery.

Other advantages and novel features of the present disclosure will become apparent from the following detailed description of various non-limiting embodiments of the disclosure when considered in conjunction with the accompanying figures.

BRIEF DESCRIPTION OF THE DRAWINGS

Non-limiting embodiments of the present disclosure will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the disclosure shown where illustration is not necessary to allow those of ordinary skill in the art to understand the disclosure.

DETAILED DESCRIPTION

The present disclosure generally relates to various compositions for forming artificial SEI layers. The artificial ESI layers may be used in electrochemical cells of batteries, such as lithium-ion batteries or other types of batteries. For example, the SEI layer may be used as a protective of an electrode for the electrochemical cell. The composition, in certain embodiments, includes a polymer, an artificial SEI forming salt, and a solvent. The polymer can provide a fast ionic pathway as well as comfortable interfacial contact. Meanwhile, robust Li salts can act as a mechanical modulus enhancer against severe interface fluctuation and dendrite growth upon cell cycling. Thus, the artificial SEI layer possesses the characteristics of high mechanical strength, good flexibility, and high Li-ion conductivity. These properties may benefit the coulombic efficiency and the charge transfer resistance ($R_{CT}$) performances for both lithium metal batteries (LMBs) and lithium-ion batteries (LIBs).

In some embodiments, by coating the artificial SEI layers having high mechanical strength, good flexibility, and high Li-ion conductivity on the electrode, the coulombic efficiency of the batteries may be effectively improved. In other words, introduction of the artificial SEI layers can lower the $R_{CT}$, so as to increase the cycle life of the battery.

The polymer is an advanced binder for electrode materials due to the superior binding properties and the ability to create a uniform ionic conducting surface coating. In some embodiments, the polymer includes homopolymers, block copolymers, random copolymers, alternative copolymers, linear polymers, brush polymers, or branch polymers. In some embodiments, the polymer has a backbone of polyolefin. In some embodiments, the polymer has a backbone of fluorinated polyolefin.

Various polymeric materials can be used. The polymeric materials may include one or more polymer, one or more co-polymer, or a combination thereof. Molecular weight of the polymer(s) and/or copolymer(s) is not particularly limited. For example, depending on the performance (e. g., ion conductivity) requirement of a devices (e.g., a solid-state, ion-conducting battery), polymer(s)and/or copolymer (s) can have a broad range of molecular weight. It may be desirable that the polymer(s) and/or copolymer(s) be conducting. A polymeric material may include a mixture of conducting polymer (s) and/or copolymer(s) and non-conducting polymer(s) and/or copolymer(s).

Polymeric materials include, but are not limited to, polymers and copolymers. The polymers and copolymers may be conducting or non-conducting. Non-limiting examples of the polymers and the co-polymers include poly(ethylene) (PE), poly(ethylene oxide) (PEO), poly(propylene) (PP), poly(propylene oxide), polymethyl methacrylate (PMMA), polyacrylonitrile (PAN), poly [bis(methoxy ethoxyethoxide)-phosphazene], poly(dimethylsiloxane) (PDMS), cellulose, cellulose acetate, cellulose acetate butylate, cellulose acetate propionate, polyvinylidene difluoride (PVDF), polyvinylpyrrolidone (PVP), polystyrene, sulfonate (PSS), polyvinylchloride (PVC) group, poly(vinylidene chloride) poly- propylene oxide, polyvinylacetate, polytetrafluoroethylene (e.g., Teflon), poly(ethyleneterephthalate) (PET), polyimide, polyhydroxyalkanoate (PHA), PEO containing co-polymers (e.g., polystyrene (PS)-PEO copolymers and poly(methyl methacrylate) (PMMA)-PEO copolymers), polyacrylonitrile (PAN), poly(acrylonitrile-co-methylacrylate), PVDF containing co-polymers (e.g., polyvinylidenefluoride-co-hexafluoropropylene (PVDF-co-HFP)), PMMA co-polymers (e.g. poly(methylmethacrylate-co-ethylacrylate)), polyethylene, polypropylene, polyvinyl alcohol (PVA), polypropylene carbonate (PPC), polyacrylic acid (PAA), and styrene butadiene rubber (SBR). These non-limiting examples also include derivatives of the polymers and copolymers. In various examples, the polymeric material is a combination of two or more of these polymers. In some embodiments, the polymer such as those described herein has a backbone of polyolefin or a backbone of fluorinated polyolefin.

Polymer(s) and/or copolymers can have various structures (e.g., secondary structure). In various examples, polymer(s) and/or copolymer(s) are amorphous, crystalline, or a combination thereof. It may be desirable that the polymer(s) and/or copolymers have low crystallinity.

In various examples, polymer(s) and/or copolymer(s) are the polymer selected from the group consisting of:

wherein $R_1$ is a structure selected from the group consisting of:

wherein n is an integer between 1 and 10,000, inclusively; m is an integer between 1 and 5,000, inclusively; $R_2$, $R_3$, $R_4$, $R_5$, and $R_6$ are each independently selected from the group consisting of:

and
* indicates a point of attachment.

The polymer, in some embodiments, is an ionomer. The ionomer includes a polymer backbone, one or more anionic substituents (which may be in the backbone and/or in one or more pendant groups), and one or more cations. In some embodiments, the ionomers include polymers containing repeating charged sub-units. Alternatively, all of the sub-units within the ionomer may not be charged. The charged sub-units may be present on the backbone and/or pendant groups within the ionomer. Examples of suitable sub-units within the ionomer include vinylsulfonate and methacrylic acid. Additional examples of the sub-units that may be present in the ionomer include, but are not limited to, substituents containing carboxylate and sulfonate anions. In some embodiments, the anions are selected from the group consisting of —COO⁻, —(CF$_2$)$_3$COO⁻, —SO$_3$⁻, —CF$_2$SO$_3$⁻, —CF(CF$_3$)SO$_3$⁻, and C$_6$H$_5$SO$_3$⁻. Specific non-limiting examples of the sub-units include fluoroalkyl sulfonate, phenyl sulfonate, trifluoromethylsulfonylimide, 4-phenylsulfonylimide, and bis(allylmalonato)borate. In some embodiments, the sub-units may be organic anions with negative charges on the oxygen or nitrogen that covalently bonded on sulfur, nitrogen, or carbon. These sub-units may be covalently attached on the polymer backbone (e.g., as grafted side units and/or as chain ends on polymer backbone).

In some embodiments, the ionomer may include one or more sub-units that may be charged, with a pH value typically present within batteries or other electrochemical cells. For example, the pH value may be at least 3, at least 5, at least 7, at least 9, at least 11, and/or no more than 13, no more than 11, no more than 9, no more than 7, no more than 5, and/or combinations thereof. In some embodiments, the ionomers can be obtained commercially.

Various ionomers can be used, including those based on organic polymers, organic-inorganic hybrid polymers, and anion acceptors. In some embodiments, the ionomers can be selected from the group consisting of:

-continued

-continued

In some embodiments, the polymer such as those described herein can be present at a concentration of at least 0.5 wt %, at least 1 wt %, at least 2 wt %, at least 3 wt %, at least 4 wt %, at least 5 wt %, at least 6 wt %, at least 7 wt %, at least 8 wt %, at least 9 wt %, at least 10 wt %, at least 11 wt %, at least 12 wt %, at least 13 wt %, at least 14 wt %, at least 15 wt %, at least 16 wt %, at least 17 wt %, at least 18 wt %, at least 19 wt %, at least 20 wt %, and/or no more than 20 wt %, no more than 19 wt %, no more than 18 wt %, no more than 17 wt %, no more than 16 wt %, no more than 15 wt %, no more than 14 wt %, no more than 13 wt %, no more than 12 wt %, no more than 11 wt %, no more than 10 wt %, no more than 9 wt %, no more than 8 wt %, no more than 7 wt %, no more than 6 wt %, no more than 5 wt %, no more than 4 wt %, no more than 3 wt %, no more than 2 wt %, no more than 1 wt %, etc. It should be noted that the concentrations of the polymers listed above are based on a total weight of the composition.

In some embodiments, an artificial SEI forming salt may be present in the composition. The artificial SEI forming salts act as a mechanical modulus enhancer and lowers the interfacial resistance. In some embodiments, the artificial SEI forming salt includes lithium salt, other salts, or a combination thereof. Examples of other salts may include $InF_3$ or the like. In some embodiments, the artificial SEI forming salt is able to react with a base material to form lithium fluoride or lithium nitride, which is good for Li deposition.

Specific non-limiting examples of the lithium salts include lithium perchlorate (LiClO$_4$), lithium hexafluorophosphate (LiPF$_6$), lithiumborofluoride (LiBF$_4$), lithium hexafluoroarsenide (LiAsF$_6$), lithium trifluoro-meta-sulfonate (LiCF$_3$SO$_3$), bis-trifluorom-ethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium nitrate (LiNO$_3$), Li-fluoroalkyl-phosphates (LiPF$_3$(CF$_2$CF$_3$)$_3$), lithium bisperfluoro-ethysulfo-nylimide (LiBETI), lithium bis(trifluoromethanesulphonyl) imide, lithium bis(fuorosulphonyl)imide, lithium trifluoromethane-sulfonimide (LiTFSI), lithium bis(fluorosulfonyl)imide (LiFSI), lithium difluoro(oxalato)borate (LiDFOB), lithium perchlorate (LiClO$_4$), LiC(CF$_3$SO$_2$)$_3$, LiF, LiCl, LiBr, LiI, Li$_2$SO$_4$, LiNO$_3$, Li$_3$PO$_4$, Li$_2$CO$_3$, Li$_2$O, LiOH, lithium acetate, lithium trifluoromethyl acetate, lithium oxalate, or a combination thereof.

In some embodiments, LiF and LiNO$_3$ are immobilized onto the Li/Cu surface by anchoring them onto a polymer matrix. During charging and discharge, the LiF and LiNO3 in the deposition layer on the Li/Cu surface will be able to immediately react with Li ion to form SEI layers onto the Li/Cu surface. The reaction of LiNO$_3$ in the deposition layer with Li in the Li/Cu surface can induce formation of Li$_3$N.

In some embodiments, the lithium salts such as those described herein can be present at a concentration of at least 0.5 wt %, at least 1 wt %, at least 2 wt %, at least 2.5 wt %, at least 3 wt %, at least 4 wt %, at least 5 wt %, at least 6 wt %, at least 7 wt %, at least 8 wt %, and/or no more than 8 wt %, no more than 7 wt %, no more than 6 wt %, no more than 5 wt %, no more than 4 wt %, no more than 3 wt %, no more than 2 wt %, no more than 1 wt %, etc. It should be noted that the concentrations of the lithium salts listed above are based on a total weight of the composition.

In some embodiments, when two lithium salts are being used, a ratio of the two lithium salt may range between 1:1 and 1:10. For example, a ratio of the two lithium salt may be 1:1, 1:2, 1:3, 1:4, 1:5, 1:6, 1:7, 1:8, 1:9, or 1:10.

In some embodiments, a solvent may be present in the composition. Non-limiting examples of the solvent includes 1,2-dimethoxyethane carbonates (DME), diglyme, triglyme, tetraglyme, diethyl ether, 1,3-dioxolane, 1,4-dioxane, tetrahydrofuran, 2,5-dimethyltetrahydrofuran, dichloromethane, tetrahydrofuran, acetone, dimethylether, dimethyl sulfoxide (DMSO), dimethylformamide (DMF), dimethylacetamide (DMAC), N-methyl-2-pyrrolidone (NMP), chloroform, or the like. In some embodiments, more than one of these solvents may be used together.

The artificial SEI layer in the present disclosure can be used in various electrolyte systems, including the electrolyte systems where SEI-forming additives are not soluble. For example, the artificial SEI layer can be used in the electrolyte systems having additive such as LiBOB, LiDFOB, fluoroethylene carbonate (FEC), vinylene carbonate (VC), N-methyl-N-propyl-pyrrolidinium bis(fluorosulfonyl)imide (Py13FSI), N-Butyl-N-methylpyrrolidinium bis(fluorosulfonyl)imide (Py14FSI), 1-ethyl-3-methylimidazolium bis(fluorosulfonyl)imide (IM12FSI), ionic liquid, Li[(FSO2)(n-C4F9SO2) N], 1,4-dioxane, bromide ionomers, methyl viologen, poly (ethyl α-cyanoacrylate), AlCl$_3$, H$_2$O, and a mixture thereof. In some embodiments, the electrolyte systems may include lithium salt such as LiFSI, LiDFOB LiAsF6, LiTFSI, LiCF$_3$SO$_3$, LiClO$_4$, LiBOB, LiBF$_4$, and LiPF$_6$. In some embodiments, a concentration of the lithium salt in the electrolyte system may range between 0.8M and 8M. In some embodiments, the electrolyte systems may include solvent in the electrolyte, and the solvent includes 1,2-dimethoxyethane carbonates (DME), diglyme, triglyme, tetraglyme, diethyl ether, ethylene carbonate (EC), diethyl carbonate (DEC), 1,3-dioxolane, 1,4-dioxane, tetrahydrofuran, and/or 2,5-dimethyltetrahydrofuran. In some embodiments, the electrolyte systems also include gelation agent, such as commercially available DA700 (Poly(ethylene glycol) diacrylate; Average Mn: 700), TA428 (Trimethylolpropane ethoxylate triacrylate; Average Mn: 428), or TA912 (Trimethylolpropane ethoxylate triacrylate; Average Mn: 912).

In some embodiments, the artificial SEI layer may be formed on a base material, so as to form an article. Specifically, the slurry having the composition may be applied onto the base material. The slurry having the composition may be applied on the base material through various coating techniques, such as spin-coating, drop-casting, dip-casing, blade-casting (e.g., doctor blade casting), Langmuir-Blodgett process, or spray-coating. In some embodiments, the application of the slurry onto the base material may be achieved through using an applicator or a doctor blade. Subsequently, the solvent in the slurry having the composition is removed to form a dried membrane evenly distributed on the base material. The solvent may be removed via, for example, techniques such as evaporation.

In some embodiments, the evaporation is performed at any suitable pressure and/or any suitable temperature. The suitable pressure includes, for example, ambient pressure, absolute pressures of less than 760 mmHg, absolute pressures of less than 750 mmHg, absolute pressures of less than 730 mmHg, absolute pressures of less than 700 mmHg, absolute pressures of less than 650 mmHg, absolute pressures of less than 600 mmHg, absolute pressures of less than 550 mmHg, absolute pressures of less than 500 mmHg, absolute pressures of less than 450 mmHg, absolute pressures of less than 400 mmHg, absolute pressures of less than 350 mmHg, absolute pressures of less than 300 mmHg, absolute pressures of less than 250 mmHg, absolute pressures of less than 200 mmHg, absolute pressures of less than 150 mmHg, absolute pressures of less than 100 mmHg, absolute pressures of less than 50 mmHg, absolute pressures of less than 25 mmHg, absolute pressures of less than 10 mmHg, or the like. On the other hand, examples of suitable temperatures include, but are not limited to, at least 0° C., at least 10° C., at least 25° C., at least 50° C., at least 75° C., at least 100° C., at least 125° C., at least 150° C., at least 175° C. and/or no more than 200° C., no more than 175° C., no more than 150° C., no more than 125° C., no more than 100° C., no more than 75° C., no more than 50° C., no more than 25° C., no more than 10° C. In some embodiments, combinations of any of these temperatures are also possible. For instance, the temperature during drying may be between 100° C. and 150° C. or from 0° C. to 200° C.

In some embodiments, the base material may be, for example, an electrode. In various examples, the electrodes having the artificial SEI layer formed thereon can be obtained by applying the composition on the electrode, so as to form a membrane anchored to the surface of the electrode. In some embodiments, the artificial SEI forming salt in the composition is reacted with the base material to form lithium fluoride or lithium nitride, which is good for Li deposition. The artificial SEI layer may have a smooth and uniform surface and the membrane may be homogeneous in composition and morphology. For example, the artificial SEI layer is compact and being homogenous at nanostructure level. In some embodiments, the membrane is a uniform ionic conducting surface coating. In some embodiments, the artificial SEI layer (the membrane) has a Young's modulus of 1 MPa to 10 GPa. During the cycle of the battery, the membrane will become an artificial SEI layer.

In some embodiments, the artificial SEI layers such as those described herein may have a thickness of at least 0.5 µm, at least 1 µm, at least 2 µm, at least 3 µm, at least 4 µm, at least 5 µm, at least 6 µm, at least 7 µm, at least 8 µm, at least 9 µm, at least 10 µm, at least 11 µm, at least 12 µm, at least 13 µm, at least 14 µm, at least 15 µm, at least 16 µm, at least 17 µm, at least 18 µm, at least 19 µm, or at least 20 µm.

In some embodiments, the electrode may be an anode. The anode material may be a conducting material. Non-limiting examples of the conducting materials include conducting carbon materials, tin and its alloys, tin/carbon, tin/cobalt alloys, silicon/carbon materials, and the like. Non-limiting examples of the conducing carbon materials include graphite, hard carbon porous hollow carbon spheres and tubes (e.g., carbon nanotubes), and the like.

In some embodiments, the anode may be a metal. Non-limiting examples of the metals include lithium metal, sodium metal, magnesium metal, and the like. In some alternative embodiments, the anode may be a lithium-free anode.

In some embodiments, the electrode may be a cathode. A cathode includes one or more of the electroactive materials in electrical contact with the electrolyte. Various electroactive material can be used. Combinations of the electroactive material may be used. The electroactive material may be a lithium ion-conducting material. Non-limiting examples of the lithium ion-conducting cathode materials include lithium nickel cobalt manganese oxide, lithium nickel cobalt aluminum oxide, lithium titanate, metallic lithium, lithium metal oxide, lithium manganese oxide, lithium cobalt oxide, lithium iron phosphate, or the like.

In some embodiments, the anode and/or the cathode maybe a current collector. In some embodiments, the current collector material includes aluminum, copper, nickel, iron, titanium, stainless steel, or carbon paper. The composition mentioned above can be applied on a current collector to form an anode with an artificial SEI layer. In some embodiments, the current collector may include metals that are stable when in contact with Li and the electrolyte between an operating voltage window of the battery. That is, the material of the current collector is stable when in contact with Li and electrolyte when the operation voltage is applied.

In some embodiments, the base material may be, for example, a separator. The separator includes, for example, a porous polyethylene membrane (e.g., Celgard 2500), or the like. In various examples, the composition can be applied on a separator for form a separator with an artificial SEI layer.

The present disclosure generally relates to a device with various electrode or separator having the artificial SEI layer mentioned above formed thereon. The device may be a battery. The battery may be an ion-conducting battery. The battery may be configured for applications such as, portable applications, transportation applications, stationary energy storage applications, and the like. Non-limiting examples of the ion-conducing batteries include lithium-ion conducting batteries, sodium-ion conducting batteries, magnesium-ion conducing batteries, and the like. The device may also be a battery comprising one or more lithium ion electrochemical cells.

In various examples, a battery may be an anode-free rechargeable battery including an anode current collector having the artificial SEI layer formed thereon, a cathode containing an electroactive material, a separator, and an electrolyte. In some embodiments, the current collector includes copper, nickel, iron, or stainless steel.

In some embodiments, the anode-free rechargeable battery further includes a cathode current collector, and non-limiting examples of the cathode current collector includes aluminum, nickel, titanium, stainless steel, or carbon paper.

In addition, the present disclosure generally relates to a method of forming the anode-free rechargeable battery including at least the following steps. A pre-assembled cell with an anode current collector having the artificial SEI layer formed thereon and a cathode is formed. A mixture of liquid electrolyte and monomer or polymer in a liquid phase of the electrolyte is introduced into the pre-assembled cell. Then, a thermal gelation process is performed to form the anode-free rechargeable battery. In some embodiments, the thermal gelation process includes a physical gelation process, a monomer polymerization process, a polymer cross-linking process, or a combination thereof. In some embodiments, the anode current collector is pre-lithiated to compensate for Li loss during cycling. In some embodiments, the cathode is over-lithiated with lithium to compensate for Li loss during cycling.

In some embodiments, an electrochemical cell may be produced using the composition as described herein. The composition may be used for manufacturing the artificial SEI layers on the positive or negative electrodes, i.e. cathodes or anodes.

In some embodiments, the composition may be coated onto a current collector. The current collector can be a metal foil and includes materials such as copper or aluminum. However, the disclosure is not limited thereto. Other current collectors can also be used. For example, a lithium-ion electrochemical cell may be prepared using a cathode and an anode both having the artificial SEI layer formed thereon.

The composition according to some embodiments of the present disclosure is prepared by mixing a polymer, an artificial SEI forming salt, and a solvent. For example, the polymer and the artificial SEI forming salt are dissolved in the solvent to form a solution.

In some embodiments, coating the artificial SEI layers having high mechanical strength, good flexibility, and high Li-ion conductivity on the electrode may improve the coulombic efficiency of the batteries. In some embodiments, the batteries such as those described herein may provide relatively high coulombic efficiency. The batteries with relatively high coulombic efficiency may be particularly useful, for example, in applications where higher coulombic efficiency are required. In certain embodiments, the coulombic efficiency of the batteries at a current rate of 0.1 C for total capacity of 3 mAh/cm$^2$ may be at least 83.35%, at least 84%, at least 85%, at least 86%, at least 87.07%, at least 88%, at least 89%, at least 90.05%, at least 90.32%, at least 91.48%, at least 92.78%, at least 93%, at least 94.64%, at least 95%, or at least 96.02%.

In some embodiments, introduction of the artificial SEI layers can lower the charge transfer resistance ($R_{CT}$), so as to increase the cycle life of the battery. In some embodiments, the batteries such as those described herein may provide relatively low $R_{CT}$. The batteries with relatively low $R_{CT}$ may be particularly useful, for example, in applications where lower $R_{CT}$ are required. In certain embodiments, the $R_{CT}$ of the batteries may be no more than 42.61 $\Omega/cm^2$, no more than 48.41 $\Omega/cm^2$, no more than 51.29 $\Omega/cm^2$, no more than 53.48 $\Omega/cm^2$, no more than 57.10 $\Omega/cm^2$, no more than 57.64 $\Omega/cm^2$, no more than 64.78 $\Omega/cm^2$, or no more than 67.94 $\Omega/cm^2$.

In addition, in some embodiments, after 200 cycles of using the discharging current of 0.5 C, the battery has a capacity retention of at least 60%, at least 72%, at least 77%, at least 82%, at least 83%, at least 84%, at least 85%, at least 86%, at least 87%, at least 88%, at least 89%, at least 90%, or the like.

The following documents are incorporated herein by reference in their entireties: Int. Pat. Ser. Apl. No. PCT/US16/52627, entitled "High Performance Nickel-Based Positive Electroactive Material for a Lithium-Ion Battery," published as Int. Pat. Apl. Pub. No. WO 2017/053275; Int. Pat. Apl. Ser. No. PCT/US17/66381, entitled "Electroactive Materials for Lithium-Ion Batteries and Other Applications," published as Int. Pat. Apl. Pub. No. WO 2018/112182; Int. Pat. Apl. Ser. No. PCT/US18/18986, entitled "Core-Shell Electroactive Materials," published as Int. Pat. Apl. Pub. No. WO 2018/156607; U.S. patent application Ser. No. 16/037,041, entitled "Ionomer Electrode Manufacturing Slurry," published as U.S. Pat. Apl. Pub. No. 2019/0020033; U.S. patent application Ser. No. No. 16/059,251, entitled "Poly (Lithium Acrylate) and Other Materials for Membranes and Other Applications," published as U.S. Pat. Apl. Pub. No. 2019/0051939; U.S. patent application Ser. No. 16/240,502, entitled "Polymer Solid Electrolyte"; a U.S. patent application filed on even date herewith, entitled "Electrodes for Lithium-Ion Batteries and Other Applications"; a U.S. patent application filed on even date herewith, entitled "Electrolytes, Anode-free Rechargeable Battery, Method of Forming Anode-free Rechargeable Battery, Battery and Method of Forming Battery"; and a U.S. patent application filed on even date herewith, entitled "Electrolytes for High-voltage Cathode Materials and Other Applications." The following are incorporated herein by reference in its entirety: U.S. patent application Ser. No. 16/240,502, filed on Jan. 4, 2019, entitled "POLYMER SOLID ELECTROLYTES"; and U.S. Provisional Patent Application Ser. No. 62/757,133, filed on Nov. 7, 2018, entitled "Polymer Solid Electrolytes," by Huang et al.

The following examples are intended to illustrate certain embodiments of the present disclosure, but do not exemplify the full scope of the disclosure. In these examples, some of the following evaluations were performed.

Coulombic Efficiency: The battery was discharged and charged between 4.3 V and 2.8 V at room temperature using a Neware tester with current rate of 0.1 C for total capacity of ~2.5 mAh/cm$^2$. To calculate the coulombic efficiency, the total charge capacity is divided by total discharged capacity.

Electrochemical Impedance Spectroscopy (EIS): Electrochemical impedance spectroscopy testing was performed by AC impedance analyzer (Interface 1010E Potentiostate, Gamry). The frequency from 1 MHz to 1 Hz was applied in testing.

Charge Transfer Resistance ($R_{CT}$): The $R_{CT}$ was read from the EIS spectrum. The $R_{CT}$ is the x-coordinate corresponding to the right endpoint of the first semicircle of the curve in the EIS spectrum.

Film Quality: The film quality was evaluated by visual inspection. The films having homogeneous film formation and no salt precipitation may be considered as films having fair film quality.

EXAMPLE 1

In Example 1, a battery includes an anode, a cathode, and an electrolyte between the anode and the cathode. $LiNi_{0.8}Co_{0.1}Mn_{0.1}O_2$ (NCM811) is being used as the cathode (2.5 mAh/cm$^2$). 0.8M LiFSI and 0.8M LiDFOB are dissolved in DME to obtain the electrolyte. The anode is a Li metal anode with an artificial SEI layer formed thereon. The artificial SEI layer is composed of $LiNO_3$ and LiF nanoparticles joined together by PEO ($LiNO_3$+LiF+PEO) and possesses high mechanical strength, good flexibility, and high Li-ion conductivity. The Li metal anode with the artificial SEI layer formed thereon is fabricated by the following steps.

2 wt % $LiNO_3$ and LiF (in 1:1 mass ratio) were dispersed in tetrahydrofuran (THF) with 0.5 wt % PEO to form a stable colloidal solution. The resulting solution was applied on the Li surface of the Li metal anode via doctor blade casting or drop casting to form an artificial SEI layer including $LiNO_3$, LiF, and PEO. The artificial SEI layer has a thickness of approximately 2.5 μm.

The film quality on Li metal is fair. The first cycle coulombic efficiency of the battery is 90.9% at a current of 0.1 C and the capacity retention at 20 cycle is 95.5%.

EXAMPLE 2

In Example 2, a battery includes an anode, a cathode, and an electrolyte between the anode and the cathode. $LiNi_{0.8}Co_{0.1}Mn_{0.1}O_2$ (NCM811) is being used as the cathode (2.5 mAh/cm$^2$). 0.8M LiFSI and 0.8M LiDFOB are dissolved in DME to obtain the electrolyte. The anode is a Li metal anode with an artificial SEI layer formed thereon. The artificial SEI layer is composed of $LiNO_3$ and $InF_3$ nanoparticles joined together by PEO ($LiNO_3$+$InF_3$+PEO) and possesses high mechanical strength, good flexibility, and high Li-ion conductivity. The Li metal anode with the artificial SEI layer formed thereon is fabricated by the following steps.

2 wt % $LiNO_3$ and $InF_3$ (in 1:1 mass ratio) were dispersed in tetrahydrofuran (THF) with 0.5 wt % PEO to form a stable colloidal solution. The resulting solution was applied on the Li/Cu surface of the Li metal anode via doctor blade casting or drop casting to form an artificial SEI layer including $LiNO_3$, $InF_3$, and PEO. The artificial SEI layer has a thickness of approximately 2.5 μm.

The film quality on Li metal is fair. The first cycle coulombic efficiency of the battery is 81.4% at a current of 0.1 C and the capacity retention at 20 cycle is 96.7%.

COMPARATIVE EXAMPLE 1

In Comparative Example 1, a battery includes an anode, a cathode, and an electrolyte between the anode and the cathode. NCM811 is being used as the cathode (2.5 mAh/cm$^2$). 0.8M LiFSI and 0.8M LiDFOB is dissolved in DME to obtain the electrolyte. The anode is a bare Li metal anode without an artificial SEI layer. That is, the cathode and the electrolyte of the battery in Comparative Example 1 is the same as that of the batteries in Example 1 and Example 2. However, the anode in Comparative Example 1 is free of artificial SEI layer.

The first cycle coulombic efficiency of the battery is 86.8% at a current of 0.1 C and the capacity retention at 20 cycle is 97%.

EXAMPLE 3

The cathode and the anode of the battery in Example 3 is the same as that of the battery in Example 1. However, the electrolyte in Example 3 is formed by dissolving 4M LiFSI, 0.1M LiBOB, and 5% DA700 in DME.

The film quality on Li metal is fair. The first cycle coulombic efficiency of the battery is 85.0% at a current of 0.1 C and the capacity retention at 50 cycle is 99.1%.

COMPATIVE EXAMPLE 2

In Comparative Example 2, a battery includes an anode, a cathode, and an electrolyte between the anode and the cathode. NCM811 is being used as the cathode (2.5 mAh/cm$^2$). 4M LiFSI, 0.1M LiBOB, and 5% DA700 are dissolved in DME to obtain the electrolyte. The anode is a bare Li metal anode without an artificial SEI layer. That is, the cathode and the electrolyte of the battery in Comparative Example 2 is the same as that of the battery in Example 3. However, the anode in Comparative Example 2 is free of artificial SEI layer.

The first cycle coulombic efficiency of the battery is 85.0% at a current of 0.1 C and the capacity retention at 50 cycle is 96.4%.

Figure 1:
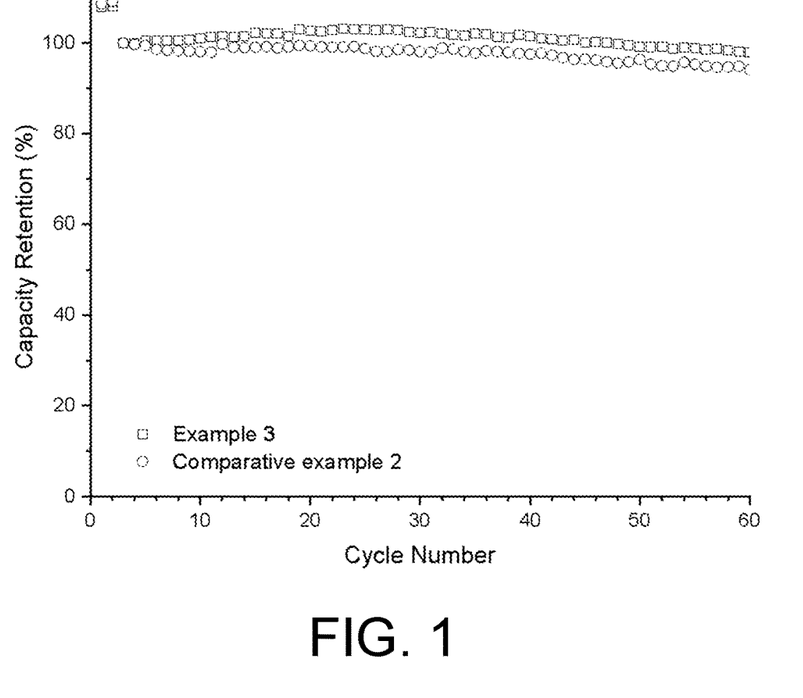
FIG. 1 illustrates cycle performance curves of batteries of Example 3 and Comparative Example 2.

FIG. 1 illustrates cycle performance curves of batteries of Example 3 and Comparative Example 2. From FIG. 1, it can be seen that the capacity retention of Example 3 is increased compare with Comparative Example 2.

EXAMPLES 4-1 TO 4-4

In Examples 4-1 to 4-4, different mass ratio of LiNO$_3$ and LiF and/or different amount of the SEI forming salt (i.e. different weight percentage of the SEI forming salt with respect to the total weight of the composition) are utilized. In Examples 4-1 to 4-4, the anode-free rechargeable cell was assembled and/or disassembled in an Ar (argon)-filled glove box. Cycling tests of Examples 4-1 to 4-4 were performed with a Neware cycling tester. Specifically, each cell was charged and discharged between 4.3 V and 2.8 V at room temperature using a Neware tester with current rate of 0.5 C to obtain the coulombic efficiency.

In Example 4-1, an anode-free rechargeable cell (Cu∥NCM811) includes a cathode, a current collector having an artificial SEI layer formed thereon, a separator placed between the cathode and the current collector, and an electrolyte. The cathode is formed by coating NCM811 on an Au foil. Celgard2500 (porous polyethylene membrane) is being used as the separator. 4M LiFSI is dissolved in DME to obtain the electrolyte.

The current collector may be referred to as a "Li-free anode" and may be adopted as the anode substrate. The artificial SEI layer is composed of LiNO$_3$ and LiF nanoparticles joined together by PEO (LiNO$_3$+LiF+PEO) and possesses high mechanical strength, good flexibility, and high Li-ion conductivity. The current collector with the artificial SEI layer formed thereon is fabricated by the following steps.

2 wt % LiNO$_3$ and LiF (in 1:1 mass ratio) were dispersed in tetrahydrofuran (THF) with 0.5 wt % PEO to form a stable colloidal solution. The resulting solution was applied on the Cu surface of the current collector via doctor blade casting or drop casting to form an artificial SEI layer including LiNO$_3$, LiF, and PEO. The artificial SEI layer has a thickness of approximately 2.5 μm.

The film quality is fair. The first cycle coulombic efficiency of the battery is 90.3% at a current of 0.1 C and the capacity retention at 50 cycle is 39.2%.

In Example 4-2, an anode-free rechargeable cell similar to that of Example 4-1 is provided. Specifically, the cathode, the separator, and the electrolyte of Example 4-2 are the same as that of Example 4-1. However, the artificial SEI layer is formed by dispersing 1 wt % of LiNO$_3$ and LiF (in 1:1 mass ratio) in THF.

The film quality is fair. The first cycle coulombic efficiency of the battery is 92.4% at a current of 0.1 C and the capacity retention at 50 cycle is 45.0%.

In Example 4-3, an anode-free rechargeable cell similar to that of Example 4-1 is provided. Specifically, the cathode, the separator, and the electrolyte of Example 4-3 are the same as that of Example 4-1. However, the artificial SEI layer is formed by dispersing 2 wt % of LiNO$_3$ and LiF with a mass ratio of 1:3 in THF.

The film quality is fair. The first cycle coulombic efficiency of the battery is 91.3% at a current of 0.1 C and the capacity retention at 50 cycle is 43.8%.

In Example 4-4, an anode-free rechargeable cell similar to that of Example 4-1 is provided. Specifically, the cathode, the separator, and the electrolyte of Example 4-4 are the same as that of Example 4-1. However, the artificial SEI layer is formed by dispersing 2 wt % of LiNO$_3$ and LiF with a mass ratio of 2:1 in THF.

The film quality is fair. The first cycle coulombic efficiency of the battery is 93.7%.

From Examples 4-1 to 4-4, it is apparent that the adoption of the artificial SEI layer can enhance the cycling stability of batteries with high area loading (about 2.5 mAhcm$^{-2}$) at 1 mAcm$^{-2}$.

Example 1 to Example 4 disclose a method to immobilize LiF, LiNO$_3$, and/or InF$_3$ onto the Li/Cu surface by anchoring them onto a polymer matrix. During charging and discharge, the LiF, LiNO$_3$, and/or InF$_3$ in the deposition layer on the Li/Cu surface will be able to immediately react with Li ion to form SEI layers onto the Li/Cu surface. Reaction of LiNO$_3$ with Li can induce formation of Li$_3$N and the reaction of InF$_3$ with Li can induce formation of LiF, which is preferred composition of good quality SEI because of its fast ionic pathway for Li$^+$ diffusion to reduce the lithium ion concentration gradient and to enable high current density cycling, high mechanical strength to accommodate the partial stress produced by uneven lithium deposition, and comfortable interfacial contact to avoid undesirable detachment and to reduce interfacial resistance.

COMPARATIVE EXAMPLE 3

In Comparative Example 3, a battery includes an anode, a cathode, and an electrolyte between the anode and the cathode. NCM811 is being used as the cathode (2.5 mAh/cm$^2$). 4M LiFSI is dissolved in DME to obtain the electrolyte. The anode is a bare Li metal anode without an artificial SEI layer. That is, the cathode of the battery in Comparative Example 3 is the same as that of the battery in Example 3. However, the anode in Comparative Example 3 is free of artificial SEI layer and the electrolyte does not include DA700.

The first cycle coulombic efficiency of the battery is 92.3% at a current of 0.1 C and the capacity retention at 40 cycle is 32.9%.

EXAMPLE 5

In Example 5, a battery includes an anode, a cathode, and an electrolyte between the anode and the cathode. The electrolyte is obtained by dissolving 1M LiPF$_6$ in EC/DEC. The cathode is a current collector (2.83 cm$^2$ Cu foil) having an artificial SEI layer formed thereon. On the other hand, the anode is Li metal with an artificial SEI layer formed thereon.

The artificial SEI layer is composed of polyacrylic acid (PAA). The Li metal anode with the artificial SEI layer formed thereon and the Cu current collector with the artificial SEI layer formed thereon are fabricated by the following steps.

2 wt % PAA was dispersed in N-methyl pyrrolidone (NMP) to form a stable colloidal solution. The resulting solution was applied on the Li metal anode surface and the Cu current collector surface via doctor blade casting or drop casting to form an artificial SEI layer. When the PAA is in contact with Li, the PAA on the Li surface immediately reacts with Li. The reaction of PAA with Li induces formation of lithium poly acrylate (Li-PAA). In other words, the artificial SEI layer includes Li-PAA. The artificial SEI layer has a thickness of approximately 2.5 μm.

The first cycle coulombic efficiency of the battery is 83.35% at a current of 0.1 C for total capacity of 3 mAh/cm$^2$. The $R_{CT}$ of the battery is 67.94 Ω/cm$^2$.

As mentioned above, when the PAA is in contact with Li, the PAA on the Li surface immediately reacts with Li. The reaction of PAA with Li induces formation of lithium poly acrylate (Li-PAA), which has high Li ion conductivity to conduct Li ions during deposition/stripping and high mechanical strength to prevent Li dendrite growth, thereby rendering a protective Li metal surface coating with a mechanically strong Li-ion conducting inorganic phase connected tightly within a flexible polymeric matrix. Due to the sufficient ionic conductivity and stability, the artificial SEI layer enables lithium metal anode to operate at high current density of 3 mA cm$^{-2}$ in Li/Li symmetrical cells and shows longer lifespan in Li/Cu half cells.

EXAMPLES 6 TO 13

In Example 6, a battery includes an anode, a cathode, and an electrolyte between the anode and the cathode. The electrolyte is obtained by dissolving 1M LiPF$_6$ in EC/DEC. The cathode is a Cu current collector having an artificial SEI layer formed thereon. On the other hand, the anode is Li metal with an artificial SEI layer formed thereon. The artificial SEI layer is composed of 8 wt % LiF nanoparticles joined together by 2 wt % lithium poly acrylate (Li-PAA). The lithium poly acrylate (Li-PAA) has a structure shown below:

The Li metal anode with the artificial SEI layer formed thereon and the Cu current collector with the artificial SEI layer formed thereon are fabricated by the following steps.

8 wt % LiF was dispersed in N-methyl pyrrolidone (NMP) with 2 wt % lithium poly acrylate (Li-PAA) to form a stable colloidal solution. The resulting solution was applied on the Li metal anode surface and the Cu current collector surface via doctor blade casting or drop casting to form a robust and low-resistance organic/inorganic artificial SEI layer including LiF and Li-PAA. The artificial SEI layer has a thickness of approximately 2.5 μm. In the artificial SEI layer, the Li-PAA is used as a high ionic conductivity matrix and LiF salt is used as a reinforcement.

The first cycle coulombic efficiency of the battery is 90.05% at a current of 0.1 C for total capacity of 3 mAh/cm$^2$. The $R_{CT}$ of the battery is 57.10 Ω/cm$^2$.

The battery in Example 7 is similar to the battery in Example 6 except the concentration of the Li-PAA is 4 wt % and the concentration of the LiF is 6 wt %.

The first cycle coulombic efficiency of the battery is 92.78% at a current of 0.1 C for total capacity of 3 mAh/cm$^2$. The $R_{CT}$ of the battery is 51.29 Ω/cm$^2$.

The battery in Example 8 is similar to the battery in Example 6 except the Li salt is 8 wt % LiNO$_3$.

The first cycle coulombic efficiency of the battery is 87.07% at a current of 0.1 C for total capacity of 3 mAh/cm$^2$. The $R_{CT}$ of the battery is 64.78 Ω/cm$^2$.

The battery in Example 9 is similar to the battery in Example 6 except the polymer is 2 wt % poly (lithium 4-styrenesulfonate) (Li-PSA) and the solvent is DMF. The Li-PSA has a structure shown below:

The first cycle coulombic efficiency of the battery is 94.64% at a current of 0.1 C for total capacity of 3 mAh/cm$^2$. The $R_{CT}$ of the battery is 48.41 Ω/cm$^2$.

The battery in Example 10 is similar to the battery in Example 6 except the polymer is 4 wt % Li-PSA, the solvent is DMF, and the concentration of the LiF is 6 wt %.

The first cycle coulombic efficiency of the battery is 96.02% at a current of 0.1 C for total capacity of 3 mAh/cm$^2$. The $R_{CT}$ of the battery is 42.61 Ω/cm$^2$.

In Examples 9-10, 2 μm poly (lithium 4-styrenesulfonate) (PSA)/LiF interface was fabricated by a dip-casting method, in which PSA provides a fast Li$^+$ diffusion as well as comfortable interfacial contact while LiF acts as a mechanical modulus enhancer and lowers the interfacial resistance. When using PSA/LiF coating as the artificial SEI layer, its uniform and highly conductive matrix offer fast ion pathway, which promotes homogenous dispersion of the oncoming lithium ion flow at the electrolyte/electrode interface and prevents the local accumulation of lithium ions. Meanwhile, the flexible-robust physical property offered by organic matrix and inorganic enhancer further suppresses the propagation of dendritic lithium. The soft part in PSA/LiF allows compliant coating without undesirable detachment from the lithium substrate that leads to the loss of protection and poor contact. Moreover, the addition of LiF salt with enhanced mechanical modulus and reduced ion diffusion barrier can effectively promote the mechanical strength of the protective layer, which is indispensable to ease the interface stress and suppress Li dendrite growth.

The battery in Example 11 is similar to the battery in Example 6 except the solvent is DMF and the Li salt is 8 wt % LiNO$_3$.

The first cycle coulombic efficiency of the battery is 90.32% at a current of 0.1 C for total capacity of 3 mAh/cm$^2$. The $R_{CT}$ of the battery is 57.64 Ω/cm$^2$.

The battery in Example 12 is similar to the battery in Example 6 except the concentration of the Li-PAA is 4 wt %, the solvent is DMF, and the Li salt is 6 wt % LiNO$_3$.

The first cycle coulombic efficiency of the battery is 91.48% at a current of 0.1 C for total capacity of 3 mAh/cm². The $R_{CT}$ of the battery is 53.48 Ω/cm².

The battery in Example 13 is similar to the battery in Example 6 except the polymer is 10 wt % lithion (an ionomer which has sulfonate anions —$SO_3^-$ covalently bonded to the polymer), the solvent is tetrahydrofuran (THF), and the Li salt is 2 wt % $LiNO_3$ and LiF (in 1:1 mass ratio). The lithion has a structure shown below:

The first cycle coulombic efficiency of the battery is 92.07% at a current of 0.1 C for total capacity of 3 mAh/cm². The $R_{CT}$ of the battery is 44.36 Ω/cm².

In the robust and low-resistance organic/inorganic artificial SEI layer, the lithion is used as a high ionic conductivity matrix and $LiNO_3$ and LiF salt are used as a reinforcement.

The soft lithion polymer with Li+ ion conducting —$SO_3Li$ group offers a higher lithium transference number ($t_{Li+}$) of about unity in liquid electrolyte, thereby providing a fast ionic pathway as well as comfortable interfacial contact. Meanwhile, the robust $LiNO_3$ and LiF salts act as a mechanical modulus enhancer against severe interface fluctuation and dendrite growth upon cell cycling. Due to the sufficient ionic conductivity and stability, the robust-flexible lithion $LiNO_3$/LiF layer (the artificial SEI layer) enables lithium metal anode to operate at high current density of 8 mA cm$^{-2}$ in Li/Li symmetrical cells and shows longer lifespan in Li/Cu half cells as well as full cells paired with NCM 811 cathode. In general, the lithion artificial SEI layer having the characteristics of higher Li$^+$ diffusion pathway, more homogeneous composition, and rigid and flexible physical properties is able to suppress dendrite growth.

COMPARATIVE EXAMPLE 4

In Comparative Example 4, a battery (2032-coin cell) includes an anode, a cathode, and an electrolyte between the anode and the cathode. The cathode is a bare Cu metal (2.83 cm² Cu foil) cathode (2 mAh/cm²) without an artificial SEI layer. The anode is a bare Li metal (1.54 cm² Li metal) anode without an artificial SEI layer. The electrolyte is obtained by dissolving 1M $LiPF_6$ in EC/DEC (1:1).

The first cycle coulombic efficiency of the battery is 81.39% at a current of 0.1 C for total capacity of 3 mAh/cm². The $R_{CT}$ of the battery is 74.02 Ω/cm².

Figure 2:
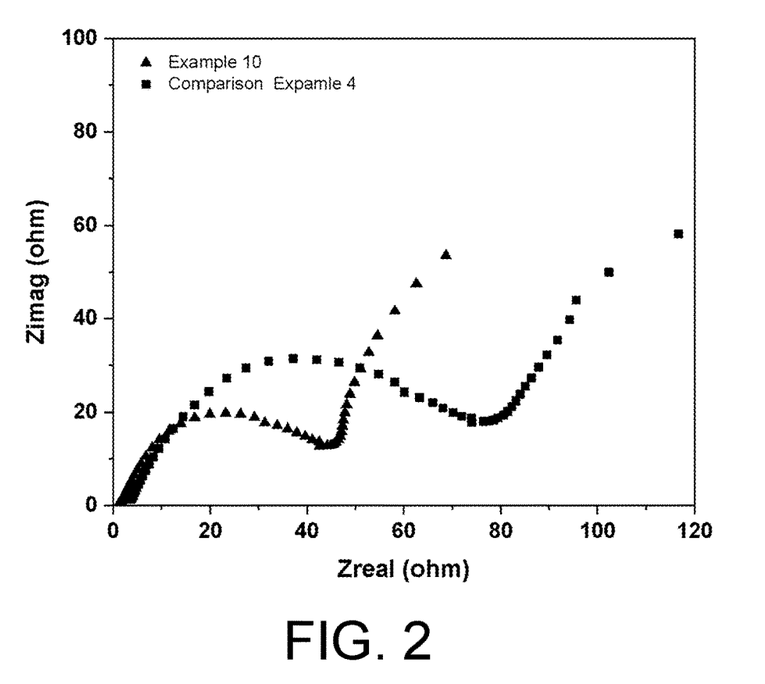
FIG. 2 illustrates EIS performance curves of batteries of Example 10 and Comparative Example 4.

FIG. 2 illustrates an EIS performance curves of the batteries of Example 10 and Comparative Example 4. From FIG. 2, it can be seen that the $R_{CT}$ of Example 10 is reduced compare with Comparative Example 4.

Compared with the unprotected Li/Cu in Comparative Example 1 to Comparative Example 4, a stable electrode polymer/Li salt interface was fabricated in Example 1 to Example 13 by combining robust inorganic enhancer with flexible polymer matrix, in which the polymer provides a fast Li$^+$ diffusion as well as comfortable interfacial contact while Li salt acts as a mechanical modulus enhancer and lowers the interfacial resistance.

The Li/Cu electrodes were protected by an artificial SEI layer containing a Li salt and a polymer. Based on the coulombic efficiency and the $R_{CT}$ provided in Example 1 to Example 13 and Comparative Example 1 to Comparative Example 4, the introduction of such an artificial SEI layer with superior Li-ion conductivity, flexibility, low resistance, high mechanical strength, and good compliance significantly enhances the stability of the Li metal anode both under static condition and during prolonged cycling. The coulombic efficiency can be improved to above 96.02% with a current density up to 3 mA cm$^{-2}$ in corrosive carbonate electrolyte on copper (Cu) current collector. If the artificial SEI layer is applied on Li metal electrode, the coating rendered a 40% increase in cycle life when paired with NMC cathode.

On one aspect, the artificial SEI layer has high Li ion conductivity to conduct Li ions during deposition/stripping and high mechanical strength to suppress dendritic lithium growth, thereby rendering a protective electrode surface coating with a mechanically strong Li-ion conducting inorganic phase connected tightly within a flexible polymeric matrix. The stability of the lithium metal interface is improved by combining robust inorganic enhancer with flexible polymer matrix together, thus realizing the superiority of Li metal anode for high energy devices such as large electric grids and electrical vehicles. Due to the sufficient ionic conductivity and stability, the artificial SEI layer enables lithium metal anode to operate at high current density of 3 mA cm$^{-2}$ in Li/Li symmetrical cells and shows longer lifespan in Li/Cu half cells.

On another aspect, the artificial SEI layer can effectively reduce the reactions between the Li metal and air, which enhances the uniformity and bind ability of the layer. The artificial SEI layer can also contribute to the even distribution of Li-ion flux across the electrode surface, resulting in more uniform Li plating/stripping behavior.

On one aspect, the symmetrical cell shows stable Li plating/stripping for more than 100 cycles without obvious increases in hysteresis. The superior long-term cycling performance of symmetrical cell is a good indicator of the stable Li plating/stripping. The interface resistance of pristine Li increases distinctly after cycling because of the accumulation of the artificial SEI layers, while the Li-PLA-Li anode exhibits low interfacial resistance. The $R_{CT}$ is lower to 51.29 Ω/cm² (in Example 7).

In summary, the artificial SEI layers in the disclosure can simultaneously achieve: fast ionic pathway for Li+ diffusion to reduce the lithium ion concentration gradient and to enable high current density cycling, high mechanical strength to accommodate the partial stress produced by uneven lithium deposition, and comfortable interfacial contact to avoid undesirable detachment and to reduce interfacial resistance. Due to the outstanding Li-ion conductivity, mechanical properties, and chemical stability, the artificial SEI layers on the electrode surface can effectively suppress Li dendrite formation and protect the Li metal surface from repeated SEI breakdown/repair under both static and long-term cycling conditions. The compact artificial SEI layers is able to hinder the reaction between the Li metal and the electrolyte. These properties may benefit the performances of lithium ion batteries.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When the word "about" is used herein in reference to a number, it should be understood that still another embodiment of the disclosure includes that number not modified by the presence of the word "about."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A composition for forming an artificial solid electrolyte interphase (SEI) layer, comprising:
   a polymer;
   an artificial SEI forming salt comprising a lithium salt and $InF_3$; and
   a solvent, wherein the polymer and the artificial SEI forming salt are dispersed in the solvent, wherein the lithium salt and $InF_3$ of the artificial SEI forming salt induce formation of lithium fluoride or lithium nitride within the polymer, resulting in formation of an artificial SEI layer on electrode or electrodes.

2. The composition of claim 1, wherein the polymer is selected from the group consisting of poly(ethylene) (PE), poly(ethylene oxide) (PEO), poly(propylene) (PP), poly (propylene oxide), polymethyl methacrylate (PMMA), polyacrylonitrile (PAN), poly[bis(methoxy ethoxyethoxide) phosphazene], poly(dimethylsiloxane) (PDMS), cellulose, cellulose acetate, cellulose acetate butylate, cellulose acetate propionate, polyvinylidene difluoride (PVDF), polyvinylpyrrolidone (PVP), polystyrene sulfonate (PSS), polyvinylchloride (PVC), poly(vinylidene chloride), polypropylene oxide, polyvinylacetate, polytetrafluoroethylene, poly

(ethyleneterephthalate) (PET), polyimide, polyhydroxyalkanoate (PHA), polystyrene (PS), PEO copolymers, poly(methyl methacrylate) (PMMA)-PEO copolymers, poly(acrylonitrile-co-methylacrylate), polyvinylidenefluoride-co-hexafluoropropylene (PVDF-co-HFP), poly(methylmethacrylate-co-ethylacrylate), polyvinyl alcohol (PVA), polypropylene carbonate (PPC), polyacrylic acid (PAA), styrene-butadiene rubber (SBR), the derivatives thereof, and a combination thereof.

3. The composition of claim 1, wherein the polymer is an ionomer, and the ionomer has an anion selected from the group consisting of —COO$^-$, —(CF$_2$)$_3$COO$^-$, —SO$_3^-$, —CF$_2$SO$_3^-$, —CF(CF$_3$)SO$_3^-$, and C$_6$H$_5$SO$_3^-$.

4. The composition of claim 1, wherein the polymer is an ionic polymer selected from the group consisting of:

29
-continued

30
-continued

-continued

-continued

5. The composition of claim 1, a concentration of the polymer is between 0.5 wt % and 20 wt % based on a total weight of the composition.

6. The composition of claim 1, wherein the lithium salt of the artificial SEI forming salt is lithium perchlorate (LiClO$_4$), lithium hexafluorophosphate (LiPF$_6$), lithiumborofluoride (LiBF$_4$), lithium hexafluoroarsenide (LiAsF$_6$), lithium trifluoro-metasulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium nitrate (LiNO$_3$), Li-fluoroalkyl-phosphates (LiPF$_3$(CF$_2$CF$_3$)$_3$), lithium bisperfluoro-ethysulfonylimide (LiBETI), lithium bis(trifluoromethanesulphonyl)imide, lithium bis(fuorosulphonyl)imide, lithium trifluoromethanesulfonimide (LiTFSI), lithium bis(fluo-rosulfonyl)imide (LiFSI), lithium difluoro(oxalato)borate (LiDFOB), lithium perchlorate (LiClO$_4$), LiC(CF$_3$SO$_2$)$_3$, LiF, LiCl, LiBr, LiI, Li$_2$SO$_4$, LiNO$_3$, Li$_3$PO$_4$, Li$_2$CO$_3$, Li$_2$O, LiOH, lithium acetate, lithium trifluoromethyl acetate, lithium oxalate or a combination thereof.

7. The composition of claim 1, wherein the artificial SEI forming salt comprises LiNO$_3$ and InF$_3$, and a ratio of InF$_3$ to LiNO$_3$ is between 10:1 and 1:10.

8. The composition of claim 1, wherein a concentration of the artificial SEI forming salt is between 0.5 wt % and 8 wt % based on a total weight of the composition.

9. The composition of claim 1, wherein the solvent comprises dimethoxyethane (DME), diglyme, triglyme, tetraglyme, diethyl ether, 1,3-dioxolane, 1,4-dioxane, tetrahydrofuran, 2,5-dimethyltetrahydrofuran, dichloromethane, acetone, dimethyl sulfoxide (DMSO), dimethylformamide (DMF), dimethylacetamide (DMAC), N-methyl-2-pyrrolidone (NMP), chloroform, or a combination thereof.

10. A battery comprising an anode having an artificial solid electrolyte interphase (SEI) layer formed on surface of the anode according to claim 1.

11. The battery of claim 10, wherein the SEI layer is formed with a stable colloidal solution comprising 0.5 wt % PEO and 2 wt % of the SEI forming salt in THF, wherein the SEI forming salt consists of $LiNO_3$ and $InF_3$.

12. The battery of claim 11, wherein the weight ratio of $LiNO_3$ and $InF_3$ is 1:1.

13. The battery of claim 11, wherein the battery has a retention rate of at least 90% after 20 cycles at a rate of 0.1 C.

14. The battery of claim 11, wherein the battery has a retention rate of 96.7% after 20 cycles at a rate of 0.1 C.

15. The battery of claim 11, wherein the SEI layer has a thickness of 0.5 μm to 20 μm.

\* \* \* \* \*